Inventors
William F. Scott
Alvin E. Burkall

March 5, 1963 W. F. SCOTT ET AL 3,080,059
AUTOMATIC COUNTERBALANCING CONTROL MEANS
FOR A ROTATING RECEPTACLE
Filed Feb. 12, 1960 7 Sheets-Sheet 3

Inventors
William F. Scott
Alvin E. Burkall
by Kiel, Sherman, Meroni, Gross, Simpson Attys.

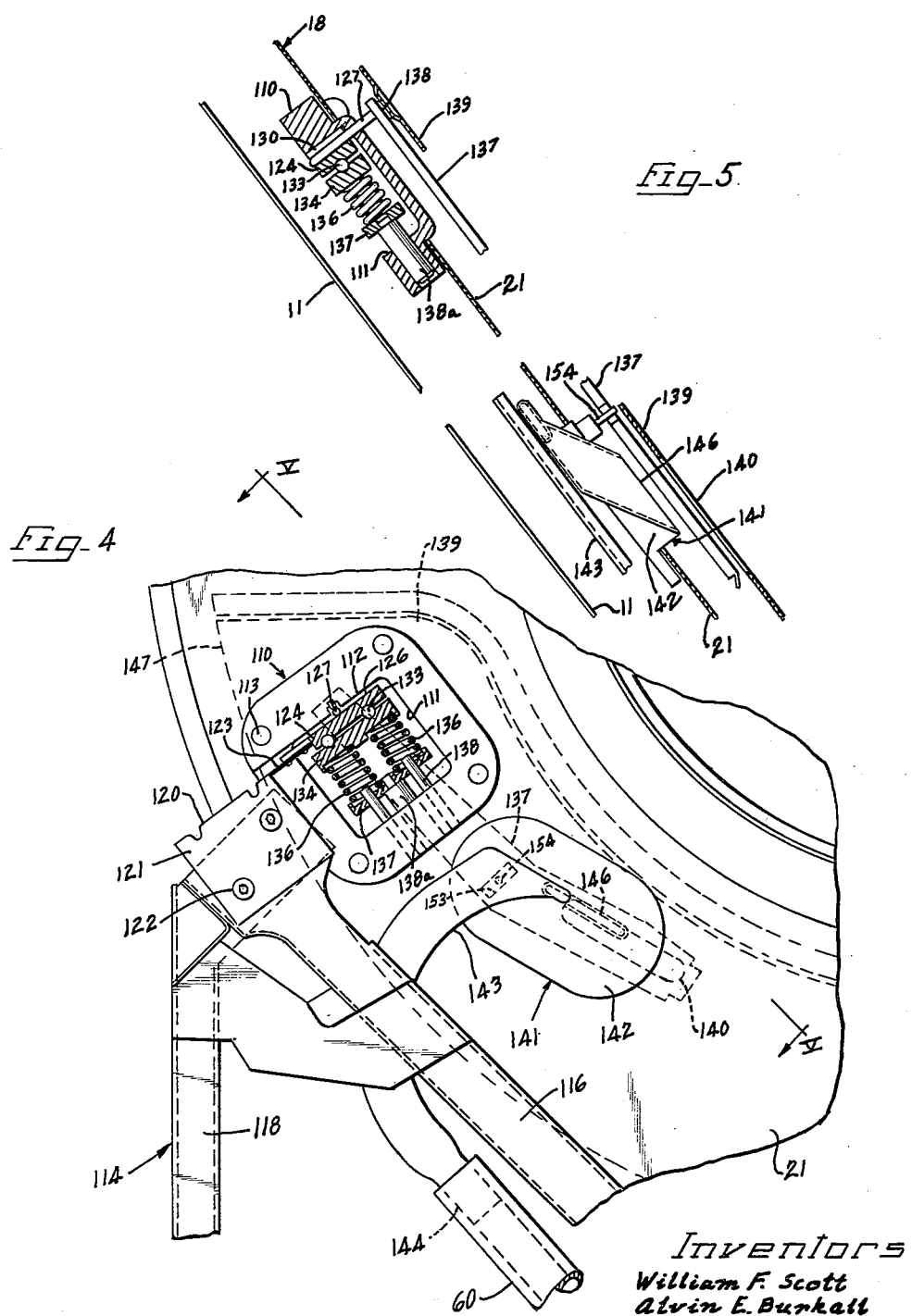

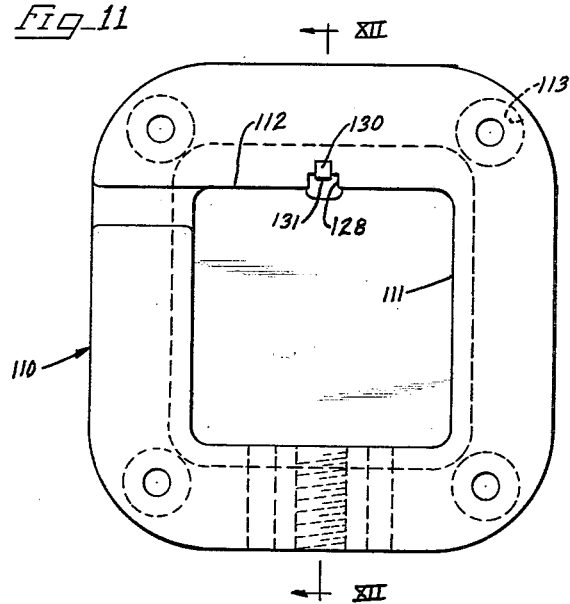
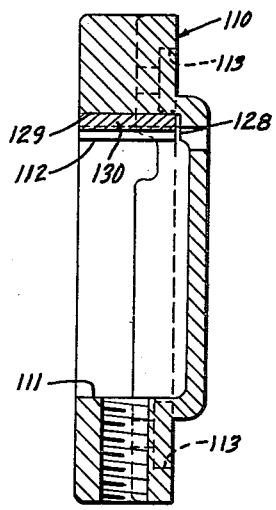
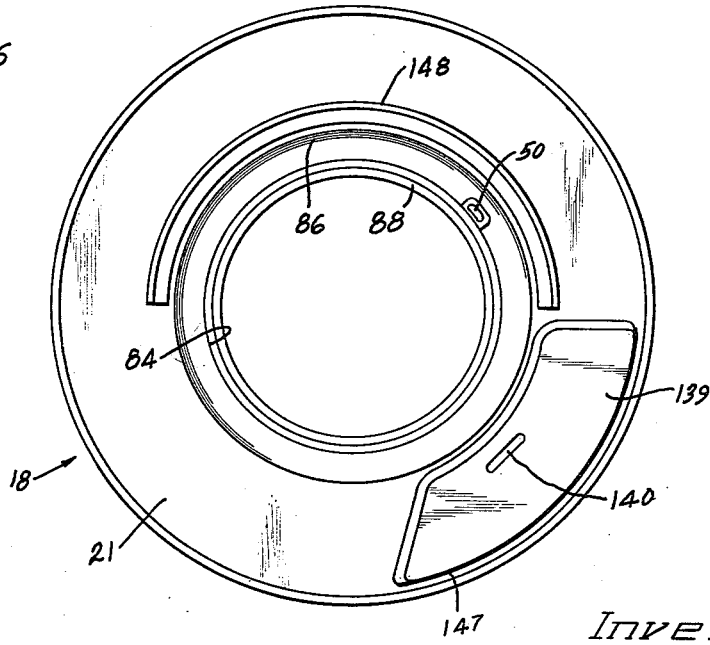

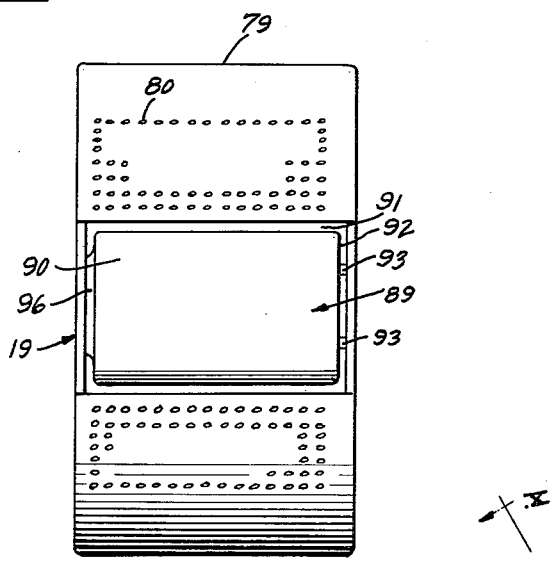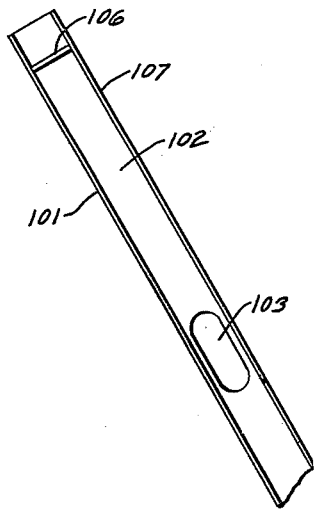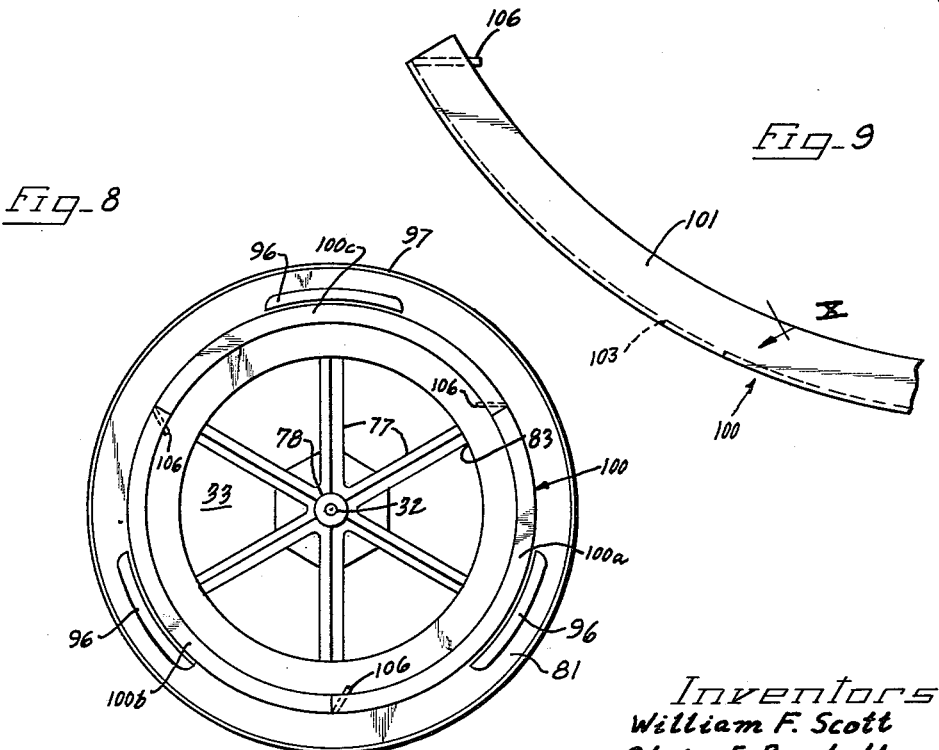

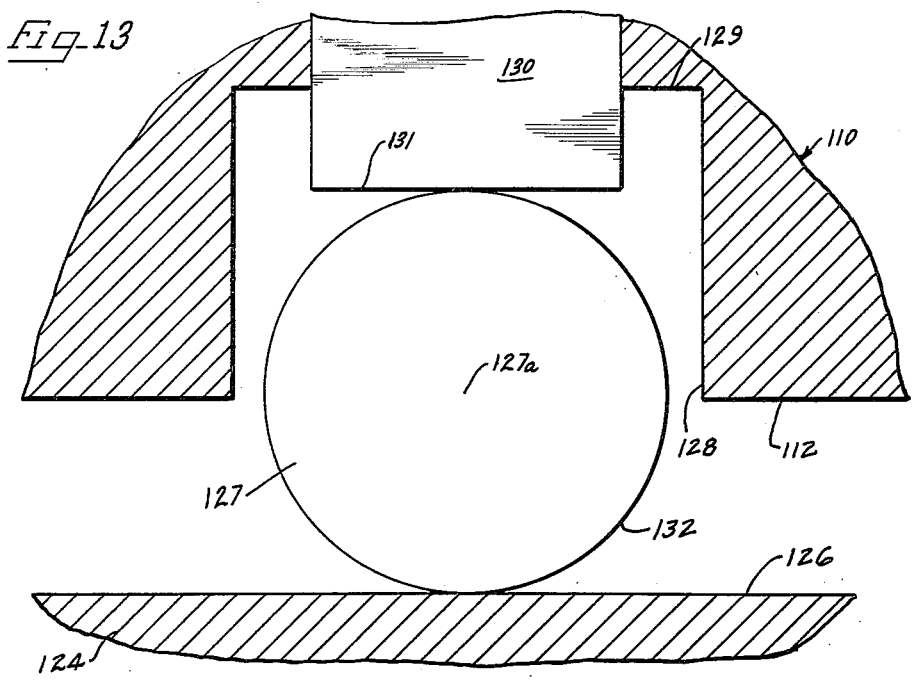
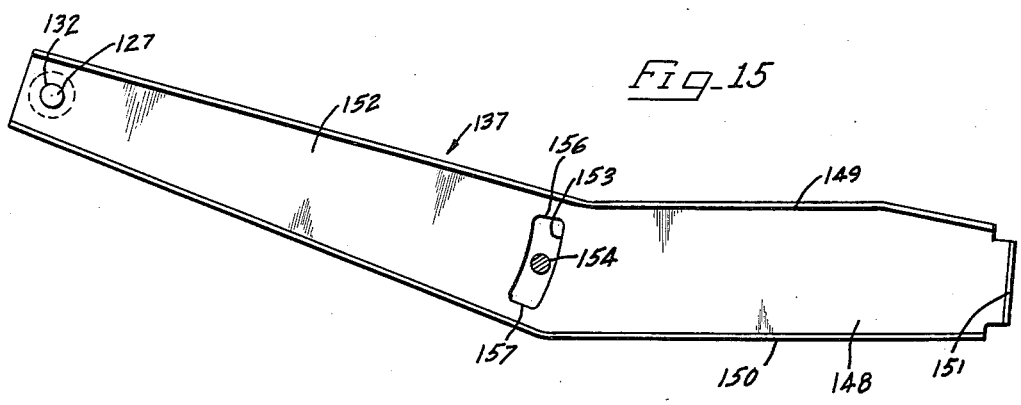
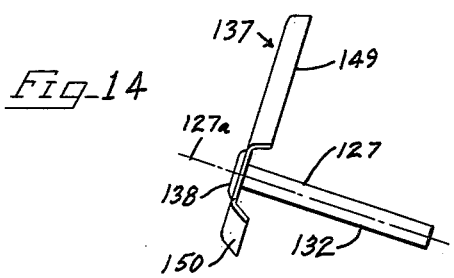

United States Patent Office 3,080,059
Patented Mar. 5, 1963

3,080,059
AUTOMATIC COUNTERBALANCING CONTROL
MEANS FOR A ROTATING RECEPTACLE
William F. Scott, Benton Harbor, and Alvin E. Burkall,
St. Joseph, Mich., assignors to Whirlpool Corporation,
St. Joseph, Mich., a corporation of Delaware
Filed Feb. 12, 1960, Ser. No. 8,275
17 Claims. (Cl. 210—144)

This invention relates generally to a method and means of counterbalancing unsymmetrically distributed centrifugal forces in a rotating body and more specifically relates to a laundry apparatus and method wherein a horizontal or substantially horizontal axis type drum containing a batch of materials to be laundered may be rotated at high speeds for optimum water extraction, without the detrimental effects caused by excessive uncontrolled vibrations.

The principles of the present invention are generally applicable to any balancing system wherein it is desired to counterbalance unsymmetrically disposed centrifugal forces generated because of unbalance in a rotating body, however, because the principles of the present invention find a particularly useful application to a laundry machine, the invention is described and illustrated in connection with a specific laundry machine associated with domestic utilization such as a typical home laundry appliance.

From the point of view of a housewife laundry machine operator, it is highly desirable that a laundry load be completely washed and dried in as short a time as possible. Such criterion is applicable whether the load of clothes to be laundered is to be line-dried or machine-dried. In either case, the length of time required to dry a particular load will be substantially directly proportion to the quantum of liquid retained in the material at the end of a washing cycle.

In contemporary domestic laundry appliances, including automatic washing machines wherein clothes are washed and centrifuged, or in so-called combination washer-dryers wherein clothes are washed, rinsed, spun dry and tumbled dry with the application of heat energy, that part of the total washing and drying time preceding the tumble dry or line dry portion of the total laundering cycle time is designated as the wash portion of the total cycle and consumes substantially the same amount of actual time for all available machines. Thus, to decrease the overall wash and dry time of a particular load, the most practical substantial time savings can be made by shortening the dry portion of the total cycle.

The usual approach to an attempted improvement of machine drying involves the consideration of increasing the drying heat input to the dryer which is somewhat undesirable from a standpoint of power consumption and the increased cost of operation thus incurred, but it is most undesirable from a standpoint of engineering design considerations which are required because of the increased power input to the drying means.

In accordance with the principles of the present invention, a second approach is made which is desirable not only from a standpoint of machine drying, but also from a standpoint of line drying and that is to increase the rotative cylinder speed used during the extraction part of the wash cycle, thereby to remove larger amounts of water from the load prior to the beginning of the tumble or line drying of the load. By increasing the spin speed utilized to remove additional water from the load, a power consumption savings of 8 to 15 times may be accomplished over the removal of this additional water by the high power input drying process.

With properly designed bearing and transmission systems power input is the primary consideration that has to be made with respect to the limit of spin speed attained in driving a mass about its exact center of mass. An empty laundry receiving cylinder or drum rotated about its bearing axis parallels an optimum operating condition, but when a load is introduced into the cylinder, the load is likely to be distributed in such a manner that the center of mass of the loaded cylinder will not coincide with the cylinder bearing axis, thereby producing an unbalanced centrifugal force which is directly proportional to the weight of the unbalanced portion of the total rotating mass and the square of the velocity of such unbalanced weight and inversely proportional to the radius of the unbalanced weight from the axis of rotation of the cylinder.

In addition to affecting the power input necessary to rotate the cylinder or drum, an unbalanced condition causes serious vibration conditions which are even more pronounced in horizontal machines than in vertical axis machines, since the unbalanced force directed substantially opposite the gravitational forces acting on the machine may be sufficiently great to actually lift the machine from its supporting surface and produce a violent movement colloquially referred to as "walking."

Because of these problems, some contemporary laundry machines of the horizontal axis type operate at a sufficiently limited spin speed so that the unbalanced loads encountered during normal operation will not produce a sufficient amount of centrifugal force to bodily lift the machine from its support. It has also been contemplated in prior art machines to provide control means whereby a spin mechanism will be inactivated in response to excessive motion in the apparatus, whereupon the drum or cylinder will decelerate to a tumbling speed for redistribution of the contents thereof. In such prior art machines, the final spin speed is limited to a value such that the total amount of liquid centrifugally extracted from the contents of the drum or cylinder is much less than is desired. It will be readily appreciated that all such extra retained liquid is required to be evaporated either by a longer period of evaporation if the goods are line dried or by consumption of an additional supply of heat energy due to a longer drying period, if the goods are machine-dried.

Other forms of balancing mechanisms employed in laundry apparatus contemplate suspension of the entire laundry machine along with an additional mass producing dead weight within the enclosing cabinet on a complex spring system. Such arrangements depend upon isolation of the source of vibration, whereupon the suspended system is allowed to violently vibrate within the enclosing cabinet, with the dead weight tending to minimize the effects of the unbalanced centrifugal forces.

With such prior art arrangements, it is inevitably necessary that the size of the enclosing cabinet must be greatly increased to allow for the violent gyratory motions of such system during operation of the machine.

In other forms of prior art machines, eccentric motions of the rotating body are sensed and located by relatively complex mechanisms which control the addition or subtraction of weights from the rotating components of the machine, thereby to counteract the unsymmetrically disposed centrifugal forces generated by the unbalanced conditions within the cylinder or drum.

In accordance with the principles of the present invention, a drum is journaled for rotation on a horizontal axis within a casing rigidly connected to a base frame. Vibratory movements of the casing are mechanically sensed by a rollable pin which converts the vibratory oscillations of the casing into angular displacements of the rollable pin. Such angular displacements are amplified mechanically through a lever arm connected to the pin and the resultant pivotal movements of the lever arm or flag are used to control the introduction of counterbalancing liquid into certain of a plurality of liquid balance pockets disposed on the periphery of the drum.

By virtue of such simple mechanical provision, the situs of the unbalance is automatically determined and only as much counterbalancing liquid as is required is added to the rotating system of the machine.

It is an object of the present invention to provide improved counterbalance control means for a rotating receptacle.

Another object of the present invention is to provide a balancing system which by a simple mechanical form of pick up and amplifying means eliminates the necessity of providing a complicated situs determining apparatus.

Another object of the present invention is to provide a balancing system for a rotating receptacle which adds to the rotating system only so much balancing liquid as is required to place the system in operational equilibrium.

Yet another object of the present invention is to provide an improved sensing mechanism for a balancing apparatus.

A still further object of the present invention is to provide a means whereby an oscillatory motion is converted into angular displacement which, in turn, is amplified into a pivotal control movement.

Another object of the present invention is to provide a balancing system for a laundry apparatus wherein the laundry apparatus wherein the laundry liquid may be effectively utilized as a balancing fluid.

Yet another object of the present invention is to provide a mechanical sensing and control device for a balancing system which automatically compensates the device to keep the operation thereof in phase with the unbalanced forces.

An object of the invention is to provide an improved phasing compensation arrangement for a mechanical vibratory pick-up in a balancing system.

Many other objects, advantages and additional features of the present invention will become manifest to those versed in the art upon making reference to the detailed description which follows and the accompanying sheets of drawings in which a preferred structural embodiment of an apparatus incorporating the principles of the present invention disclosed by way of illustrative example.

On the drawings:

FIGURE 4 is an enlarged fragmentary view constituting a layout of the specific sensing mechanism incorporated in the machine of the present invention;

FIGURE 5 is a cross-sectional view taken generally on line V—V of FIGURE 4 but with parts removed in order to show additional details of construction of the mechanism of FIGURE 4;

FIGURE 6 is a view of the back surface of the front wall of the casing taken generally in the plane of line VI—VI of FIGURE 2;

FIGURE 7 is a side elevation of the drum or receptacle used in the machine of the present invention;

FIGURE 8 is a front elevational view of the drum of FIGURE 7 as viewed in the plane of line VIII—VIII of FIGURE 2;

FIGURE 9 is a fragmentary view of an inlet segment for one of the balance tanks or pockets;

FIGURE 10 is a fragmentary plan view of the inlet segment of FIGURE 9 taken in the plane of line X—X of FIGURE 9;

FIGURE 11 is a front elevation of the balance housing used on the machine of the invention;

FIGURE 12 is a cross-sectional view taken on line XII—XII of FIGURE 11;

FIGURE 13 is a greatly enlarged fragmentary view showing additional details of the rollable pin and the associated action surfaces provided in accordance with the present invention;

FIGURE 14 is a side elevation of the pin and flag sub-assembly;

FIGURE 15 is a front elevation of the pin and flag sub-assembly of FIGURE 14.

As shown on the drawings:

Figure 1:
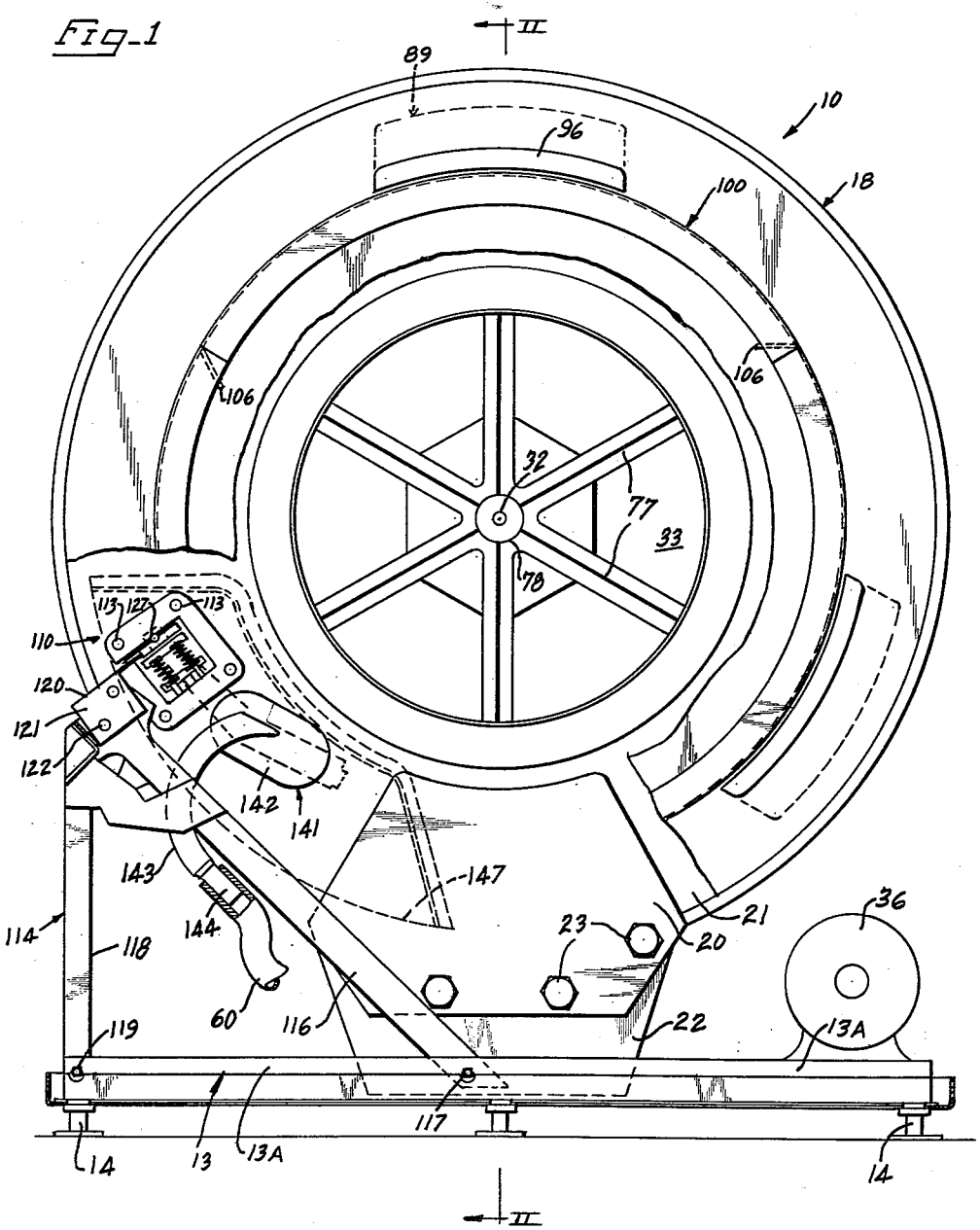
FIGURE 1 is a front elevational view of a laundry machine incorporating the principles of the present invention but with the outer cabinet removed and with parts broken away and with other parts removed for clarity.

The particular form of structural organization selected to illustrate the principles of the present invention comprises a so-called combination washer-dryer intended for use as a domestic laundry appliance and shown generally at 10. The machine 10 comprises an outer cabinet 11 forming an aesthetically appealing enclosure for the machine 10 and providing a front wall characterized by an access door 12 through which a batch of materials to be laundered may be placed in or withdrawn from a treatment zone formed within the machine.

Within the outer cabinet 11 is a rigid base structure shown generally at 13. This base structure or frame 13 consists of a channel member 13A, plate 22 fixedly secured to channel member 13A, and front legs 14 which are bolted to channel meber 13A. Included as part of the base frame 13 is the single rear leg 16 which is bolted to member 26.

The machine 10 also includes a generally imperforate outer casing shown at 18 and a perforate drum 19.

The casing 18 is connected to and supported on the base frame 13 by a front support plate member 20. The plate member 20 is integrated with a front wall 21 of the casing 18 as by welding and is securely fastened to an upstanding leg or plate 22 of the base frame 13 by a plurality of fasteners, shown generally at 23.

At the rear portion of the machine, the casing 18 is provided with a rear wall 24. A single vertical supporting structure is provided by a shaped metal form member 26 integrated with the rear wall 24 as by welding. Rear leg 16 is fastened as shown at 27 to member 26.

The rear wall of the casing 18 has an embossed portion 28 centrally apertured as at 29 and cooperable with a support spider 30 connected in firm assembly with the rear wall 24 to rigidly mount a bearing assembly shown generally at 31 and in which is journaled a shaft 32 connected for corotation with a rear wall 33 of the drum 19.

Figure 2:
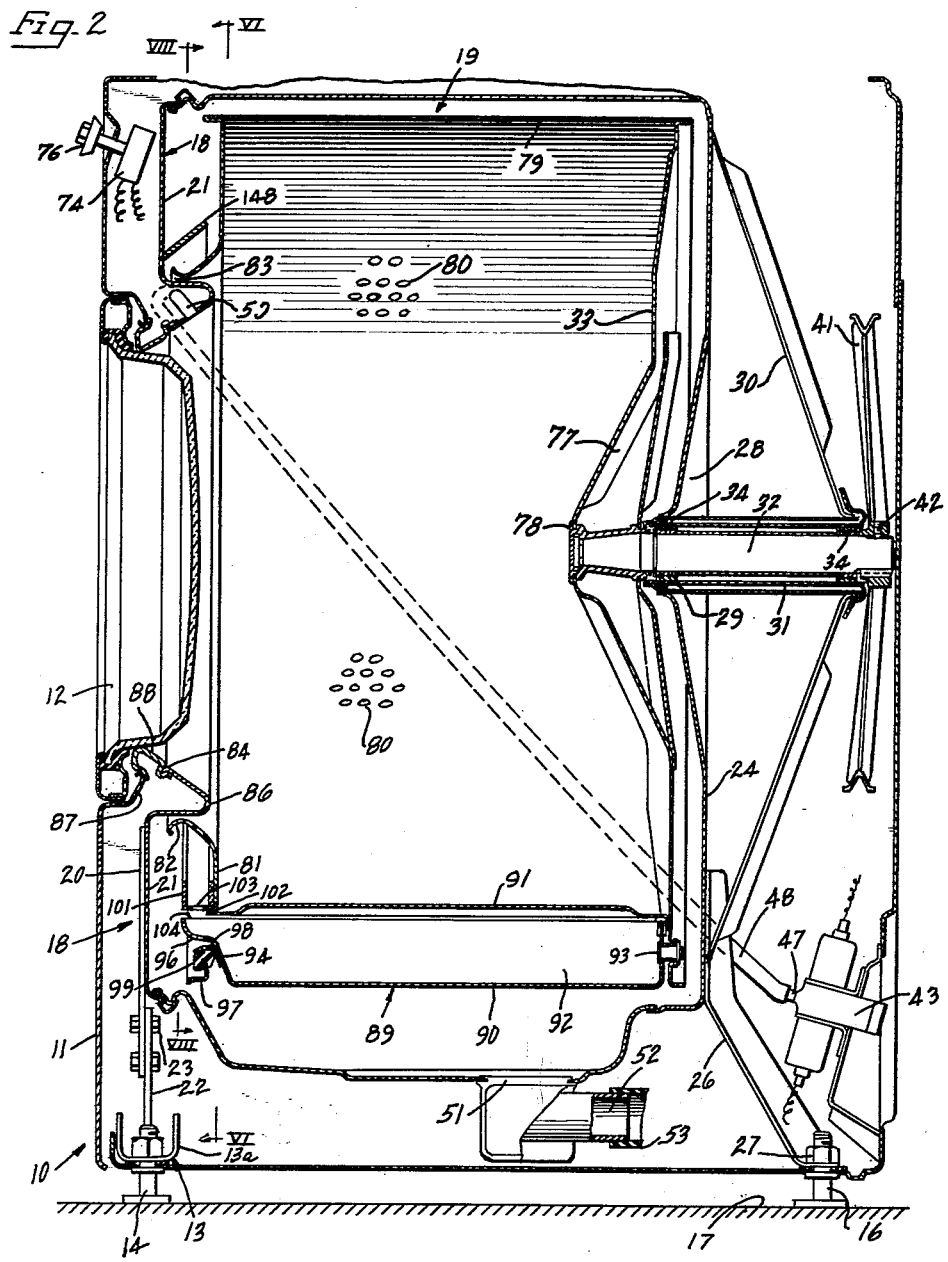
FIGURE 2 is a cross-sectional view taken generally on line II—II of FIGURE 1 but with portions of the cabinet added and with other operative components of the machine added for the sake of clarity in completing the description of the inventive subject matter.
Figure 3:
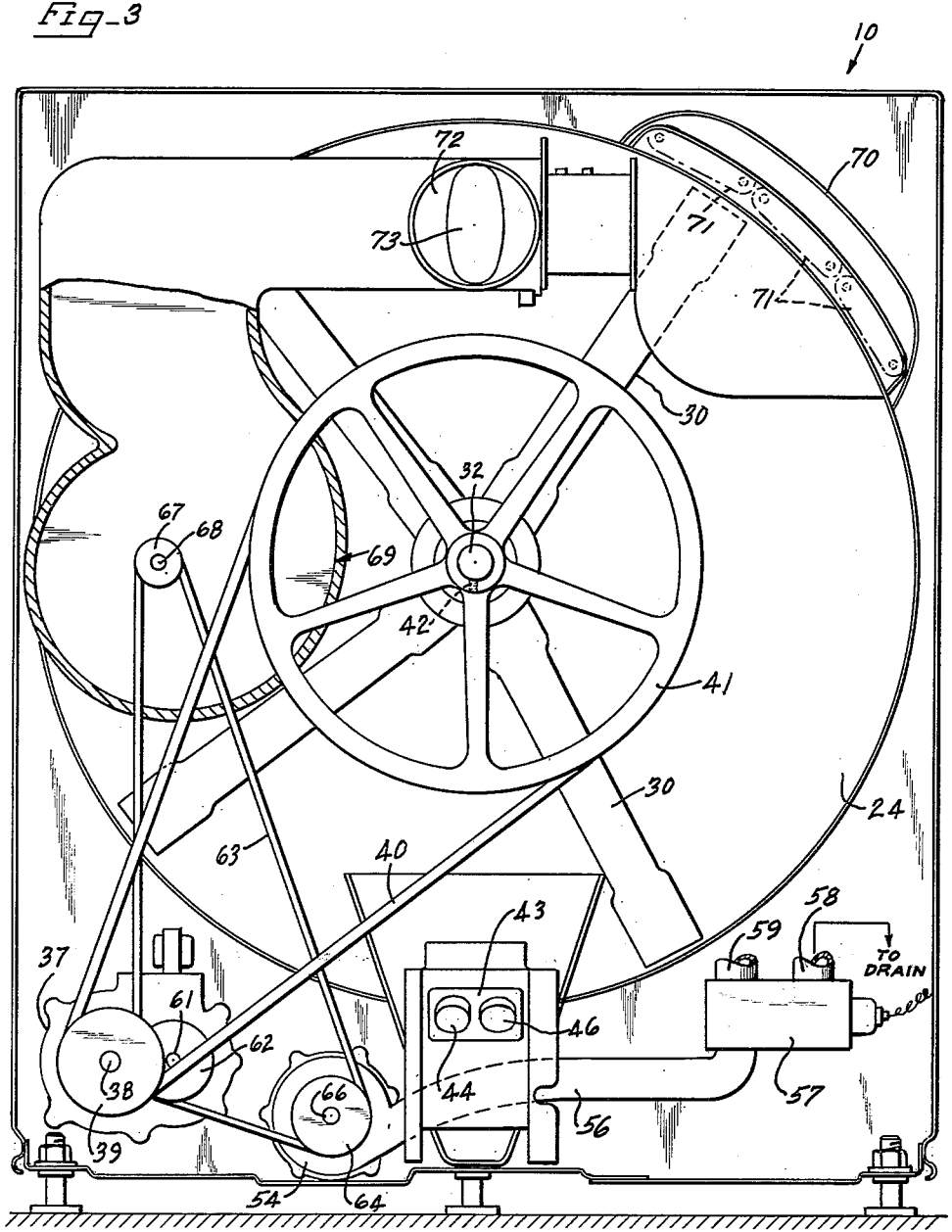
FIGURE 3 is a rear view of the machine of FIGURES 1 and 2 but with some of the parts removed and with other parts shown out of position for the sake of clarity.

It will be noted from an inspection of FIGURE 2 of the drawings that the bearing assembly 31 includes an outer housing which engages directly against the rear wall 24 and the support spider 30 of the casing 18 and includes ball bearing races 34, 34 associated with the shaft 32 to provide a relatively rigid bearing support of the drum 19 in the casing 18. The rigid bearing means thus provided for the drum 19 insures the cooperative relation required between the drum 19 and the casing 18, in accordance with the principles of the present invention.

Furthermore, it will be noted that the connections provided by the parts 20 and 22 between the base frame 13 and the casing 18 are rigid connections, however, there is sufficient yieldability in such connections that some very small movement of the casing 18 relative to the base frame 13 may occur. The connections afforded by the connection of parts 20 and 22 to channel member 13A and the connection of part 26 to the casing 18 are sufficiently rigid to confine the casing 18 for oscillatory movements about an axis positioned parallel to and located below the horizontal rotational axis of the drum 19 prescribed by the shaft 32. In the machine exemplified by the disclosure hereof, such allowable arcuate movement is approximately 0.010 inches from its normal centered position as measured from an approximate 16 inch lever arm.

The machine 10 is equipped with an electric drive motor 36 having a power take-off shaft drivingly connected with a transmission shown generally at 37. The transmission 37 has a first take off shaft 38 to which is connected a pulley 39 over which is positioned a pulley belt 40 driving a pulley wheel 41 connected in driving relation to the shaft 32 by key locking means 42.

The machine further includes the usual inlet water mixing valve construction, shown generally at 43 and including a cold water inlet 44 and a hot water inlet 46 adapted to be connected to the usual source of domestic supply. The mixing valve assembly 43 has an outlet 47 connected to a hose or conduit 48 leading to a fresh water inlet 50 carried in the front wall 21 of the casing 18 and discharges fresh temperature-conditioned water into the treatment zone for mixture with a suitable additive such as a detergent in forming a laundry liquid or for use as a rinsing agent.

The machine 10 is further provided with a sump 51 in the bottom of the casing 18 which sump 51 has an outlet 52 connected by means of a conduit 53 to a pump 54. The pump 54 discharges through an outlet conduit 56 into a two-way valve shown generally at 57. The two-way valve 57 has a first outlet 58 adapted to be connected by suitable conduit means, if necessary, to drain and a second outlet 59 connected by means of a conduit 60 to the balancing system of the machine.

The transmission 37 of the machine 10 includes a further take-off shaft 61 to which is attached a pulley 62 engaging a pulley belt 63 positoned over a pulley wheel 64 attached to a shaft 66 of the pump 54 and also driving a pulley wheel 67 attached to a shaft 68 of a blower shown generally at 69. The blower 69 comprises a part of the machine air duct system and for the sake of simplicity is depicted in somewhat diagrammatic form. It will be understood, of course, that the drying system could effectively utilize either a fuel-fired heating means or an electrically energized heating means and the exemplary illustration contained herein shows the blower 69 discharging either into a heater box 70 containing electrical heating elements 71 or to the atmosphere through a vent opening 72. Vent opening 72 is controlled by a solenoid operated valve 73 so that a stream of ventilating air is normally recirculated through the machine during all operations except an actual drying operation when a stream of moisture-laden air is vented through the opening 72 to the atmosphere.

It will be understood that the machine 10 has a sequential control means shown generally at 74 which is presettable by the operator as at 76 and which is associated by the usual electrical circuitry with all of the operating components of the machine including the electric drive motor 36, the motor-actuating means for the mixing valve 43, valve 73 and the two-way valve 57, as well as the operating means of the transmission 37 and the pump 54 to actuate the machine through a program consisting of washing, rinsing, extracting and drying periods. Thus, in a typical operation, the operator will load a batch of clothes to be laundered through the door 12 into the drum 19. Upon initiation of a preselected program, the casing 18 will be charged with a supply of water. Following the washing operation, the laundry liquid will be drained through the sump 51 and discharged to drain via the opening 58. The materials within the drum are then subjected to an extraction operation followed by rinsing and a subsequent extraction operation, which portion of the washing cycle may be repeated as often as may be desired in accordance with the preset program. After the final extraction operation, the machine either continues through a drying period involving operation of the drying system and including the addition of heat of vaporization to the stream of ventilating air circulated through the treatment zone, or the batch of materials being laundered may be removed from the machine by the operator for line drying.

Having thus described the general operation and organization of an exemplary embodiment of the invention subject matter, the specific improvements contemplated in the balancing system may now be referred to in greater detail.

The drum 19 has formed in its back wall 33 a plurality of radially extending, angularly spaced strengthening ribs 77. At the center of the back wall 33, the drum 19 is connected as at 78 to the shaft 32. The outer peripheral wall of the drum 19 is formed by a foraminous wrapper 79 and is particularly characterized by a plurality of openings shown generally at 80, through which liquid may escape the interior of the drum into the casing 18. A front wall 81 is formed which extends radially inwardly of the outside wrapper 79 and terminates in an axially offset outwardly flared mouth or lip 82 forming an opening 83 through which materials to be laundered may be charged into the interior of the drum 19. The opening 83 is in register with the door 12 and is also in register with a front opening 84 formed in the front wall 21 of the casing 18. In order to minimize leakage, the front wall 21 of the casing 18 is particularly characterized by an axially inwardly extending annular rib 86.

The rib 86 of the casing 18 and an inwardly extending flange 87 on the outer cabinet 11 are interconnected with one another by a rubber sealing gasket 88, the radially inwardmost portions of the gasket 88 resiliently sealed against the glass surface of the door 12.

At a plurality of circumferentially spaced points on the periphery of the drum 19, recess means are provided to accommodate mounting in such recess means of a liquid balancing receptacle shown generally at 89. Each receptacle 89 comprises a generally trough-shaped tray member having a wall 90 which is spaced radially outwardly of an imperforate wall portion 91 formed on the drum 19 at the recessed area. The receptacle 89 further includes side and end walls 92, thereby to facilitate connection as at 93 between the rear portion of such walls and the adjoining rear wall 33 of the drum 19.

The front wall of each receptacle 92 is particularly characterized by an inclined portion 94, thereby having both radial and axial extent and terminating in an axially protruding spout or nose 96 which projects beyond the axial extent of the front wall 81 of the drum 19. In this connection, note that the spout 96 extends inwardly of an outer front flange 97 formed at the outer extremity of the front wall 81 on the drum 19. To facilitate mounting of the receptacle 89 in the drum, a bracket member 98 on receptable 89 is forced against a resilient gasket 99 which fits over an inwardly extending leg of the flange 97.

Each receptacle 89 is provided with an inlet segment 100a, 100b and 100c, respectively, the inlet assembly being indicated generally at 100. Each inlet segment is of generally U-shaped configuration including an outer leg 101 (FIGURE 2) spaced axially from the wall 81 of the drum 19 and an arcuate peripheral wall 102 having formed therein an opening 103 through which all of the fluid within the inlet segment is discharged radially outwardly into spout 96 of the open side 104 of the receptacle 89. FIGURES 9 and 10 show the structural characteristics of each respective inlet segment and it will be noted that each segment has an end wall 106 disposed between the side walls, the outermost of which has already been identified at 101 and the innermost of which is shown at 107. In the exemplary disclosure illustrated, there are three receptacles 89 and, accordingly, each segment 100a, 100b and 100c may, if desired, extend through 120° of arc on the front wall 81 of the drum 19 and are attached in firm assembly as by welding or the like to the front wall 81 in register with the liquid supply means provided to introduce balancing fluid thereinto.

In order to control the introduction of balancing fluid into the receptacles 89 by way of the inlet segments 100a, 100b and 100c, it is contemplated by the present invention that there be utilized, as a controlling variable, a mechanical signal manifested as a relatively small linear movement between the casing 18 and a relatively stationary reference means. A balance housing, as shown generally at 110 and comprises a generally square-shaped article shown in greater detail in FIGURES 11 and 12 having a center depression 111 so that the upper wall of the aperture 111, shown at 112, may conveniently comprise a surface portion movable in unison with the casing 18, the balance housing 110 being fastened in firm assembly with the front wall 21 of the casing 18 by appropriate fastening means indicated at 113.

In order to provide a relatively stationary reference with respect to the balance housing 110, there is provided a reference means mounted on channel member 13A of the base frame 13. More specifically, there is provided a subframe 114 or generally A-shaped frame including an oblique leg 116 fastened in firm assembly with the base frame 13 as at 117 and a vertical leg 118 also fastened in firm assembly with the base frame 13 as at 119.

At the apical portion of the A-shaped sub-frame, there is mounted a slide assembly including a slide member 120 having a mounting bracket 121 fastened in firm assembly to the A-shaped sub-frame by one or more fasteners 122 and having extending away from the bracket 121 an arm 123 to which is connected a slide block 124 having a hardened surface 126 confronting the wall 112 of the balance housing 110 and closely spaced with respect thereto in parallelism therewith.

In order to sense the oscillatory movements of the casing which are produced as a function of any unbalance manifested within the rotating drum 19, there is provided a sensing member which takes the form of a rollable pin 127 and which pin is confined between the surfaces 112 and 126. More specifically, and as is clearly shown in FIGURE 13, the surface 112 is particularly characterized by a niche or grooved slot 128 having a width slightly larger than the outer diameter of the rollable pin 127, thereby to receive the pin 127 with clearance. The grooved slot 128 has a bottom wall 129 in which is received a hardened insert 130 which projects into the niche or slotted groove 128 to present a surface 131 for engagement against the peripheral surface 132 of the pin 127.

The curved surface 132 of the pin 127 is on a fixed radius with respect to the center line axis of the pin 127 shown at 127A and, therefore, the relative linear movement produced between the surfaces 112 and 126 will be converted by the sensing member or pin 127 into angular movements about the pivot axis 127A by the rolling action of the pin 127 between the relatively moving surfaces.

In order to insure that the pin 127 is tightly confined between the surfaces, continuous biasing means are provided to back up the slide block 124 and in this connection, it will be noticed that the rear surface of the sliding block 124 is appropriately recessed to receive a plurality of ball bearing members 133, there being further provided a backing plate 134 engaged on one side against the ball bearing members 133 and seating on the opposite side a plurality of coil springs 136. The opposite end of each coil spring 136 is bottomed in a guide support 137 retained for relative sliding movement on pin means shown at 138 carried in firm assembly with the balance housing 110. The guide support 137 is carried on an adjusting screw 138A that is threaded into the balance housing 110 to control the loading of the springs 136.

The angular movements of the pin 127 are amplified through a moment arm provided by a lever arm connected in firm assembly with one end of the pin 127, which lever arm is provided by an interrupter or flag member shown at 137. In order to effect firm connection between the pin 127 and the interrupter member 137, the end of the pin 127 on an opposite side of the interrupter member 137 may be upset as at 138 and the two components welded together so that any rolling motion of the pin 127 will be manifested by pivotal movement of the interrupter member 137. The interrupter member 137 extends generally parallel to the front wall 21 of the casing 18 and is closely spaced to a splash housing 139 mounted on the inside surface of the front wall 21 between the casing 18 and the drum 19. As is clearly shown in FIGURE 6 of the drawings, the splash housing 139 is particularly characterized by the formation of a slotted opening 140. Mounted in register with the slotted opening 140 but on the front wall 21 of the casing 18, there is provided a nozzle assembly shown generally at 141. The nozzle assembly includes a mounting plate 142 welded or otherwise secured in firm assembly with the front wall 21 of the casing 18 and the nozzle assembly 141 includes further a conduit 143 having a coupling portion 144 connected to the hose or conduit 60. The nozzle 141 is particularly characterized by a narrow elongated nozzle outlet 146 arranged in discharging register with the slotted opening 140 in the splash housing 139.

Both the nozzle assembly 141, discharge outlet 146 and the slotted opening 140 are located directly adjacent to the arcuate path of movement of the interrupter member 137. Thus, the movements of the casing produced as a function of any unsymmetrically disposed load in the rotating drum 19 is sensed in a linear motion of the surface 112 and 126, whereupon the rolling pin 127 which is forcefully and resiliently squeezed between a portion of the front of the casing 18 and the vertical stationary extension of the base frame 13 will convert such movements into angular displacement. The rolling pin 127 provides a pivotal axis 127A for the water deflector member or interrupter flag 137 which is normally positioned in the path of a fluid stream discharged through outlet 146 of conduit 60 and the nozzle assembly 141 during extraction operations. The deflection means provided by the interrupter member 137, which is located within the casing 18 on the rear side of the casing front wall 21 and spaced from both the casing front wall 21 and the splash housing 139, will serve to deflect and direct the stream emanating from the nozzle outlet 146 downwardly in the splash housing 139 for return to the casing 18 and specifically the sump 51 since the bottom of the splash opening 139 is open as shown at 147. The opening 140 in the splash housing 139 as well as the nozzle opening 146 is aligned with the three inlet segments 100A, B and C carried on the front of the drum 19.

In operation, the movements of the casing 18, due to the rotation of unbalanced loads within the drum, cause a pivotal movement of the interrupter member 137 away from the fluid stream emanating from the nozzle opening 146 so that the fluid may be injected directly into an appropriate inlet segment for passage to the correct fluid-receiving pocket or compartment provided by a corresponding receptacle 89 on the drum 19 for automatically counteracting the unbalanced load causing the arcuate movement of the casing.

Since each of the balance pockets provided by the receptacles 89, 89, 89 extend beyond the front of the drum 19, the balancing fluid is allowed to drain out by gravity upon deceleration of the drum 19 at the end of an extraction operation. To insure that such draining liquid does not again reenter the drum through possible passage of the opening 83, there is provided on the front wall 21 of the casing 18 a baffle ring shown at 148, which baffle ring extends around the upper half of the rib 86 but spaced radially outwardly thereof.

The water or liquid used for balancing, in accordance with the principles of the present invention, is taken from the machine sump 51 and is fed to the balancing nozzle assembly 141 by the machine pump 54 to assure a constant flow pressure independent of the inlet water pressure to the machine 10. A water level control system can be incorporated into the machine to assure that there will always be enough water in sump 51 for proper and rapid counterbalancing. The interrupter member 137 merely diverts the flow from the nozzle assembly 141 back into the sump 51, unless a large enough unbalanced load is present to cause the interrupter member 137 to be pivoted out of the path of fluid emanating from the nozzle assembly 141, whereby the liquid flow enters the proper inlet segment or segments of the inlet segments 100A, B, and C on the front of the drum 19 for discharge through an opening 103 into a corresponding receptacle 89.

In the exemplary form of the structure herein described each of the three illustrated inlet segments 100a, 100b and 100c are aligned with the center line of the associated receptacle 89 though, as hereinafter further explained, it may be desirable that these inlet segments start at the approximate center line of the associated receptacle 89 and extend for approximately 120° from the center line of the corresponding receptacle, that is, in the direction of rotation of drum 19. Moreover, in the illustrated embodiment, the nozzle assembly 141 with its nozzle opening 146 is located approximately 60° below the horizontal center line and approximately 30° to one side of the vertical center line of the drum 19. Moreover, the nozzle outlet 146 is arranged so that the angle of dispersion of the fluid stream discharged from the nozzle outlet 146 will be directed approximately 30° in the direction of rotation of the drum 19 and approximately 15° downwardly. In the illustrated embodiment, the offset from the vertical center line is towards the left-hand side of the machine using the orientation of FIGURE 1. With this orientation the direction of rotation of the drum 19 is in a counterclockwise direction. It will be appreciated, however, that the rotational direction of the drum and the actual positioning of the nozzle assembly and sensing device can be modified to suit any desired circumstances.

Since the highest drum speed is substantially below the critical frequency of the nearly rigid mounting system, an assumption may be made for explanatory purposes that there is no angular difference between the deflection of the casing 18 and the unbalanced force producing that deflection and which unbalanced force results from the unsymmetrically disposed centrifugal forces produced during rotation of the drum 19. This assumption is what is referred as an "in phase condition." In the illustrated embodiment, the maximum angular deflection of the casing 18 and the cylinder or drum 19 will occur to the right of the vertical center line as the unbalanced load passes the horizontal center line in an upward direction. Furthermore, the maximum angular deflection to the left will occur as the unbalanced load passes the horizontal center line in a downward direction and to the left of the vertical center line.

To correct an unbalanced load causing the casing and drum assembly to oscillate about its center of oscillation, it is necessary with the assumed "in phase condition" to add counterbalancing fluid to the balance tank or tanks in the drum directly opposite the unbalanced load. To accurately accomplish the introduction of the balancing fluid to the inlet segments 100, so that the situs of the unbalance will actually be located or sensed by the device, the nozzle and the sensing means are located to the left of the vertical center line and below the horizontal center line, thereby to respond to deflections of the casing and drum assembly to the right of the vertical center line. Of course, at this time the assumption is also made along with such "in phase condition" that the relationship between the interrupter member 137 and the deflection of the casing and drum assembly is such that the interrupter member 137 will be pivoted to a position to allow the balancing fluid to enter the inlet segments 100 over the upper edge of the interrupter member 137.

When a laundry load is being spun out in the machine cylinder, it is normal that due to the uncontrolled positioning of the load along the cylinder inner periphery, an unequal mass distribution will exist causing an unbalanced load. Even though during the duration of this spin period the distribution of the load along the cylinder inner periphery will not change, the rate of centrifugal extraction of the water retained in the load at different sections of the cylinder will be different so therefore the mass distribution constantly is changing and new unbalanced loads appear at different locations in the cylinder until all of the water that can be moved by the particular cylinder speed has been removed. In accordance with the principles of the present invention, however, an automatic adjustment is effected whereby the necessary relationship between the interrupter member 137 and the deflection of the casing and drum assembly is maintained throughout the complete extraction period, regardless of the changing or relocation of any new unbalanced loads appearing during the course of the extraction period.

Note, first of all, however, that as the unbalanced load in the drum 19 rotating counterclockwise passes the bottom portion of the geometric vertical center line of the system, deflection of the mounted system would tend to be in the vertical direction and at this point, which may be referred to as a "zero" degree reference point, the vertical center line of the suspended system will correspond to the geometric vertical center line.

As the unbalanced load progresses upward towards the horizontal center line or 90° position, the angular difference between the vertical center line of the mounted system and the reference geometric center line, will increase from zero degrees at the zero degree reference line to its maximum angular deflection to the right at 90° or at the horizontal center line. From 90° to 180° rotation of the unbalanced load in the upward direction, the angular deflection of the mounted system decreases to where it would again be zero degrees as the unbalanced load passes the geometric vertical center line. The last 180° travel of the unbalanced load would be the same as the first 180° of travel, with the maximum deflection to the left occurring as the unbalanced load passes the horizontal center line or the 270° position in a downward direction.

For proper counterbalancing of such an unbalanced load in an assumed "in phase condition," it is necessary that when maximum deflection of the casing and drum assembly occurs to the right, the interrupter member 137 will be in its lowest pivotal position to allow the balance water to pass over the top of the interrupter member 137 and into the inlet segments 100 on the front wall 81 of the drum 19 so that the balance water can pass from the inlet segments 100 into the proper receptacle or receptacles 89 directly opposite the unbalanced load. Thus, in the system illustrated when the casing and drum assembly is at its maximum deviation to the left of the vertical center line, the interrupter member 137 will be in its uppermost pivotal position but will still be interrupting the flow from the balance water nozzle 141. This assures that no balance water enters the system that would actually add to the amount of unbalanced load.

However, when an unbalanced load appears in the drum 19, it is necessary to have the interrupter member 137 positioned so that every time maximum casing and drum deflection occurs to the right of the vertical center line, the interrupter member 137 will be in its lowermost position to allow for the passage of balancing water from the nozzle outlet 146 into the inlet segments 100. This system assures in the exemplary structure that the counterbalancing water will enter the balance tank or tanks directly opposite the unbalanced load which is the necessary condition to eliminate the effects of the unbalanced load.

In the arrangement illustrated, whenever the casing and drum assembly moves to the right, the rollable pin 127 will be rolled in such a manner as to pivotally displace the interrupter member 137 downwardly. Movement to the left will cause the interrupter member 137 to move upwardly.

When the proper relationship exists between the interrupter member 137 and the drum and casing assembly, the interrupter member 137 will move an equal amount in opposite directions from its neutral position and in exact phase with the drum and casing assembly deflection.

In this connection, note that the interrupter member 137 comprises a sheet form member having a body portion 148 which is physically interposed between the nozzle outlet 146 and the opening 140 in the splash housing 139. The edge portions of the sheet form member are flanged, thereby to provide an upper flanged edge 149 and a lower flanged edge 150, the end portion of the interrupter member 137 also being flanged as at 151.

Intermediate the length of the interrupter member 137, there is provided an angularly offset body portion shown at 152. The pin 127 is firmly assembled at the end of the body portion 152. At approximately the point of junction between the portion 152 and the main body portion 148, there is provided an arcuate slot 153 which is transversely disposed relative to the longitudinal extent of the interrupter member 137 and which elongated slot 153 is spaced from the pivot axis 127A. The nozzle assembly 141 is particularly characterized by the formation thereon of a pin 154 which pin extends away from the wall 21 of the casing 18, thereby to be received into the slot 153.

The opposite ends of the slot 153 provide spaced shoulders 156 and 157, respectively, thereby forming stops for engaging against the pin 154 and limiting the amount of pivotal movement enjoyed by the interrupter member 137.

If the interrupter member 137 is in proper relationship with respect to the casing and drum assembly, the pin 154 will be located exactly in the center of the slot 153 and the relative movement of the pin and slot 154 and 153 will involve movement in equal amount on each side of the pin 154 as the drum is rotated and the casing oscillates. If the deflection of the casing and drum assembly is severe, as it often is at the beginning of the spin speed acceleration period, the pin 154 may actually touch each end or shoulder 156 and 157 of the slot 153 during the oscillation or movement.

It is possible after the pin 127 is assembled or even during operation of the machine 10 that when the transmission 37 is shifted and the drum 19 is accelerated towards an increased spinning speed, the pin 154 will not be located in the exact center of the slot 153. Therefore, if during the maximum deflection of the casing and drum assembly, due to an unbalanced load, to the right, the shoulder 156 of the slot 153 does not contact the pin 154, the shoulder 157 will have to contact the pin 154 corresponding to a position of the unbalanced load some place between the 180° to 270° positions in the reference system referred to above, but still prior to the attainment of maximum casing and drum deflection to the left.

After such contact has been made between the shoulder 157 and the pin 154, the interrupter member 137 is prevented from any further pivotal or rotatable motion. Since at this time the casing and drum assembly is still at less than maximum deflection to the left, the interrupter member 137 will be prevented from rotating and such restraint will necessitate a sliding or a slipping motion of the pin 127 in its position between the moving surface associated with the balance housing 110 and the stationary surface 126 associated with the A-shaped subframe 114 of the base frame 13. Such sliding motion of the pin 127 will continue in the assumed "in phase condition" until the unbalanced load has reached its 270° position corresponding to maximum casing and drum deflection to the left. At this exact point, the casing and drum assembly will start to deflect towards the right and the pin 127, due to the changing direction of the moving surfaces associated with it, is again free to roll rather than slide, but in the opposite direction whereupon the lower end 157 of the slot 153 will separate from the pin 154.

If maximum deflection of the casing and drum assembly to the right is large enough, the shoulder 156 of the slot 153 may contact the pin 154 and slight sliding of the rollable pin 127 may occur, but the rolling action will again occur as soon as the unbalanced load passes the 90° position and the casing and drum assembly is again deflecting toward the left. Regardless of whether or not the pin 154 and the shoulders 156 and 157 of the slot 153 again make contact, it will be seen that the interrupter member 137 and the deflection of the casing and drum assembly are in their proper relationship so that the unbalanced load can be counterbalanced.

As each unbalanced load is counterbalanced, the casing and drum assembly deflection and thus the interrupter member deflection return to where practically zero deflection exists. As other unbalanced loads appear and begin to produce a casing and drum assembly deflection, the interrupter member 137 will also begin to oscillate in phase with the casing and drum deflection so that the proper relationship between the two deflections will exist and counterbalancing of the new unbalanced load will take place.

It is also possible that while one unbalanced load is being counterbalanced, a different unbalanced load may appear in a different part of the drum 19. Depending on the magnitude of each of the unbalanced loads, an effective resultant unbalanced load will appear. The exact point of the cylinder on which such resultant unbalanced load is directed will then become the part of the cylinder or drum that will produce the maximum deflections. The interrupter member of flag 137 moves exactly in phase with such resultant unbalanced load that produces the maximum deflections and thus the water balance system of the present invention will counterbalance such resultant unbalanced load. In this manner, all unbalanced loads that appear within the drum 19 of the present invention are rapidly and effectively counterbalanced.

It will be understood that the operation of the system of the present invention has been explained with regard to an "in phase condition" of the relationship between the unbalanced load and the deflection it produces. In practice, the expected top operating spin speed of the cylinder or drum is sufficiently below the critical frequency of the rigid casing and drum assembly so that the phase shift existing between the unbalanced load and its resulting casing and drum assembly deflection is negligible. To accommodate phase shifting whereby the unbalanced load angularly leads the deflection it produces, the structure of the present invention requires only that the relationship of the inlet segment and its corresponding balance pocket be modified so the leading edge of the inlet segment will be in some position less than 120° from the center line of the corresponding balance tank. Such changed relation thus allows the balancing fluid to enter the balance tank sooner than in the "in phase condition" described hereinabove.

In practice it may be desirable to utilize this balancing apparatus in conjunction with some form of a cylinder acceleration control to minimize the amplitude of the cylinder-tank assembly deviations during cylinder acceleration periods though it is not necessary to do so in order to practice the invention set forth herein.

Although various minor modifications might be suggested by those versed in the art, it should be understood that we wish to embody within the scope of the patent warranted hereon all such modifications as reasonably and properly come within the scope of our contribution to the art.

The embodiments of the invention in which an exclusive property or privilege is claimed are defined as follows:

1. A laundry extractor comprising supporting means, a casing, means mounting said casing on said supporting means for limited movement relative to said supporting means, an extractor drum, means mounting said drum for rotation within said casing, drive means for rotating said drum to effect the extraction of fluids from wet fabrics within said drum, a plurality of pockets carried in spaced relation on the circumference of said drum for receiving fluid to counterbalance unbalanced loads created by non-uniform distribution of said fabrics within said drum, means defining a first surface connected to said supporting means, means defining a second surface connected to said casing and confronting said first surface, said first and second surfaces moving substantially linearly with respect to one another as a function of vibration due to unbalance, means for directing fluid into said pockets to effect a counterbalancing of such unbalanced loads during rotation of said drum to reduce the amplitude of vibrations of said casing relative to said supporting means and deflector means for interrupting the direction of fluid into said pockets and including a pin member interposed between and operatively engaged by said first and second surfaces for shifting said deflector means out of interrupting position when the amplitudes of said vibrations exceed a predetermined level.

2. Apparatus for counterbalancing a rotating receptacle comprising a base, support means on said base including bearings for journaling said receptacle, means on said base and on said support means forming two confronting relatively movable surfaces, counterbalancing means for said receptacle including a plurality of circumferentially positioned pockets for receiving liquid, and means for introducing liquid into said pockets selectively comprising conduit means having a nozzle for directing a stream of liquid towards said pockets, and a movable baffle interposed between said nozzle and said pockets, a cylindrical pin connected to said baffle, said cylindrical pin being confined between said two surfaces and rotatable about its own axis in response to movement between said relatively movable surfaces, thereby to pivotally move said baffle for alternately interrupting and introducing the flow of liquid into certain of said pockets as a function of the movement of said surfaces induced by rotation of unbalanced loads in said receptacle.

3. A laundry extractor comprising, supporting means, a casing, means mounting said casing on said supporting means for arcuate movement relative to said supporting means, an extractor drum, means rigidly mounting said drum for rotation within said casing, drive means for rotating said drum to effect the extraction of fluids from wet fabrics within said drum, a plurality of pockets carried on said drum for receiving fluid to counterbalance unbalanced loads created by non-uniform distribution of said fabrics within said drum, means defining a first flat surface connected to said supporting means, means defining a second flat surface connected to said casing and openly confronting said first surface, said second surface movable in unison with said casing linearly with respect to said first surface, means for directing fluid into said pockets to effect a counterbalancing of such unbalanced loads during rotation of said drum to reduce the amplitude of vibrations of said casing relative to said supporting means, a control pin member positioned between and contacting said surfaces in driven relationship, said pin member having an axis and oscillating around said axis upon vibratory movements of said casing relative to said supporting means, means for introducing fluid into said pockets during the rotation of said drum, and means connected to said control pin member for interrupting fluid flow into said pockets until the amplitude of such vibrations rises above a predetermined level.

4. The invention set forth in claim 3 in which said casing is affixed to said supporting means and said arcuate movement is produced by flexure between said supporting means and said casing.

5. The invention set forth in claim 3 further comprising, resilient means biasing said first and second surfaces against said control member, said control member being a roll pin confined between said surfaces for both oscillatory and transverse movements, and abutment means adjacent said surfaces limiting movements of said roll pin relative to said surfaces.

6. The invention set forth in claim 3 further including means for automatically maintaining said control member in phase with changing off balance loads placed within said drum.

7. The invention set forth in claim 3 further including means for automatically indexing said control member relative to said pockets whenever the relationship between said control member and said pockets is changed by bodily movement of said extractor.

8. A laundry apparatus comprising an imperforate outer casing for retention of laundry liquid, a perforate drum journaled for rotation in said casing on a horizontal axis, a base frame having connection with said casing sufficiently rigid to confine said casing for limited movements on an arcuate path about an axis offset from the rotational axis of the drum, a control member having a pivot pin, means on said base frame and said casing forming two confronting flat surfaces relatively movable linearly, said pivot pin being positioned between and engaging said surfaces to pivot on its axis in unison with the movement of said casing relative to said base frame, and means including means regulated by said control member for fluid balancing unsymmetrical centrifugal forces generated during rotation of said drum to which movements of said casing on said path are responsive.

9. In a balancing system for a body rotatable on a horizontal axis, a plurality of counterbalance liquid pockets on said body with each having inlet means radially outwardly of said axis and being angularly spaced in a radial plane at one end of said body, a support means for said body including a stationary reference base and a support base connected thereto and together forming first and second surfaces relatively movable in a linear path in response to vibration of said surfaces induced by an unbalanced load in said rotatable body, a control member having a pivot axis and having a first sensing portion formed with a curved action surface spaced radially outwardly of said pivot axis and operatively confined between said surfaces to convert the relative movement of said first and second surfaces into angular displacements of the control member around said pivot axis and having a second interrupter portion forming a lever arm extending outwardly from said pivot axis to move pivotally in amplified unison with said sensing portion, conduit means having an outlet for discharging a fluid stream into said inlet means, said interrupter portion being interposed between said inlet means and said outlet and being movable to allow balancing fluid from said stream to enter certain of said inlet means past said interrupter portion, said first and second surfaces together with said control member and said outlet being offset relative to said vertical and horizontal center lines so that maximum deviation on said linear path in one direction relative to the vertical center line coincides with said interrupter portion being in a stream-interrupting position while maximum deviation in the opposite direction coincides with the interrupter portion being moved to pass fluid from said stream into an inlet means for balancing the unsymmetrically disposed mass in the rotating body.

10. In a sensing system for a vibration-susceptible casing and drum assembly mounted in a base frame, a first surface associated with a vibration-susceptible casing and drum assembly, a second surface associated with a stationary base frame, a rollable pin having a pivot axis and confined between said surfaces to convert linear oscillation between said casing and said base frame into angular displacements of said rollable pin about said pivot axis, a lever arm connected to said pin to transmit and amplify said angular displacements as pivotal movements of said lever arm, said lever arm having a transverse recess formed therein spaced from said pivot axis, a relatively stationary pin connected to said casing and drum assembly and extending into said recess and limiting the pivotal movement of said lever arm produced by rolling of said pin between opposite ends of the recess, whereupon further linear movements of said surfaces will slidably reposition said rollable pin between said surfaces, thereby to move the lever arm in phase with unbalanced loads placed in said casing and drum assembly.

11. A laundry machine comprising a casing having a front wall formed with an access opening, a drum rotatable on a horizontal axis in said casing and having a front opening aligned with said access opening, a fluid system comprising conduit means having a fresh water inlet discharging into said casing to charge the casing with water for washing and rinsing, said conduit means including a pump having a pump inlet communicating with the bottom of said casing, a two-way valve connected to said pump to receive the discharge therefrom, said two-way valve having a drain outlet and a separate nozzle outlet, said separate nozzle outlet being mounted in said front wall of said casing, said nozzle directing a stream of fluid towards the front of said drum and outwardly of the front opening of said drum, a plurality of circumferentially spaced balance pockets on said drum each having an arcuate inlet segment in register with said nozzle, each said inlet segment leading the corresponding pocket in the direction of rotation of the drum, a lever arm forming a deflector flag adjustably movable through said stream of fluid between said nozzle and said inlet segments, a pivot pin at one end of said flag, means forming an action surface engaging said pin to roll said pin in response to linear oscillation of said action surface, thereby to pivotally adjust said lever arm relative to said stream, means to move said action surface as a function of the unbalance in the drum, means to rotatably drive said drum at tumbling and spinning speeds, and sequential control means to operate said machine through a program of washing, rinsing and extracting periods, whereby during operation of said drum at spinning speeds said flag will admit liquid discharged by said nozzle into certain of said pockets to correct any unbalance in said drum during said extraction period.

12. A laundry machine as defined in claim 11 and compensation means to keep said lever arm in phase with the unbalance in the drum.

13. A laundry machine as defined in claim 12, said compensation means comprising means to relatively adjust the location of said pivot pin against said action surface.

14. A laundry machine as defined in claim 12, said compensation means comprising means forming spaced apart fixed stops and operable to limit the pivotal displacement of said flag while accommodating slidable readjustment of said action surface relative to said pin.

15. In laundry apparatus having a rotatable laundry receptacle, a lever arm, a pivot pin at one end of said lever arm, means forming an action surface engageable with said pin whereby linear reciprocating movements of said action surface will produce rolling movements of said pin and pivot said lever arm, fluid balancing means for said laundry receptacle including means for introducing a stream of liquid into receptacle balancing means, said lever arm adapted to extend into the stream of liquid to control the flow of liquid into the balancing means, means to move said action surface in response to unbalance in the laundry receptacle, and compensation means for said lever arm to compensate for phase shifting comprising fixed reference means adjacent an intermediate portion of said lever arm and spaced from said pivot pin, detent means formed between said fixed reference means and said lever arm providing a pair of spaced stops limiting movement of said lever arm induced by rolling of said pin relative to said fixed reference means so that said pin and said action surface will automatically slidably readjust relative positions to keep the lever arm in phase with the unbalance in the receptacle.

16. Apparatus for counterbalancing a rotatable receptacle comprising, a casing, a rotatable receptacle in said casing and means for driving said receptacle, a base frame having connections with said casing sufficiently rigid to confine said casing for limited movement when unsymmetrical centrifugal forces are generated during rotation of said receptacle, a plurality of fluid-receiving pockets mounted on said receptacle for receiving counterbalancing fluid, and control means controlling the addition of fluid to said pockets to effect counterbalancing during rotation of unbalanced loads within said receptacle, said control means including means on said base frame and on said casing forming two confronting flat surfaces relatively movable linearly, and rollable means having a rolling axis and being positioned between and engaging said surfaces to roll on said axis in unison with the movement of said casing relative to said base frame, and means including means regulated by said rollable means for fluid balancing unsymmetrical centrifugal forces generated during rotation of said receptacle to which movements of said casing are responsive, said rollable means mechanically indexing said control means with respect to said pockets to assure addition of counterbalancing fluid to the proper pockets during counterbalancing of the receptacle.

17. Apparatus as defined in claim 16 wherein said rollable means comprises a cylindrical pin.

References Cited in the file of this patent
UNITED STATES PATENTS

| | | |
|---|---|---|
| 2,534,267 | Kahn | Dec. 19, 1950 |
| 2,534,269 | Kahn et al. | Dec. 19, 1950 |
| 2,569,005 | Kindling | Sept. 25, 1951 |
| 2,647,386 | Keiper | Aug. 4, 1953 |
| 2,717,698 | Armstrong | Sept. 13, 1955 |